United States Patent
Kinoshita et al.

(10) Patent No.: US 8,411,124 B2
(45) Date of Patent: Apr. 2, 2013

(54) OPTICAL WRITING DEVICE, IMAGE FORMING APPARATUS, AND METHOD AND PROGRAM PRODUCT FOR CONTROLLING OPTICAL WRITING DEVICE

(75) Inventors: Izumi Kinoshita, Hyogo (JP); Kunihiro Komai, Osaka (JP); Tatsuya Miyadera, Osaka (JP); Yoshinori Shirasaki, Osaka (JP); Takuhei Yokoyama, Osaka (JP); Takeshi Shikama, Osaka (JP); Akinori Yamaguchi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 47 days.

(21) Appl. No.: 13/224,987

(22) Filed: Sep. 2, 2011

(65) Prior Publication Data
US 2012/0056961 A1  Mar. 8, 2012

(30) Foreign Application Priority Data
Sep. 6, 2010  (JP) .................................. 2010-199009

(51) Int. Cl.
*B41J 2/435* (2006.01)
*B41J 2/47* (2006.01)
*B41J 2/45* (2006.01)

(52) U.S. Cl. ........ 347/247; 347/248; 347/237; 347/153; 347/238

(58) Field of Classification Search .................. 347/237, 347/238, 247, 248, 253
See application file for complete search history.

(56) References Cited

U.S. PATENT DOCUMENTS
6,402,281 B1 * 6/2002 Nakahara et al. ............... 347/15
7,110,128 B1 * 9/2006 Kaburagi et al. ............ 358/1.15
2011/0043592 A1  2/2011 Kinoshita et al.

FOREIGN PATENT DOCUMENTS
| JP | 2000-177165 | 6/2000 |
| JP | 3381582 | 12/2002 |
| JP | 2007-245537 | 9/2007 |
| JP | 2009-27683 | 2/2009 |

OTHER PUBLICATIONS
U.S. Appl. No. 13/230,104, filed Sep. 12, 2011, Miyadera, et al.

* cited by examiner

*Primary Examiner* — Stephen Meier
*Assistant Examiner* — Sarah Al Hashimi
(74) *Attorney, Agent, or Firm* — Oblon, Spivak, McClelland, Maier & Neustadt, L.L.P.

(57) ABSTRACT

A pixel information acquiring unit acquires multilevel pixel information in which one pixel is expressed in multilevel scales. A line pixel information storing unit stores the multilevel pixel information for each main scanning line. A light emission control unit optically exposes a photosensitive element by controlling a binary light source on the basis of the multilevel pixel information. The photosensitive element is exposed to the binary light source with a period corresponding to N-fold in a sub scanning direction resolution of the multilevel pixel information, wherein N is a positive integer, so that the N times exposures corresponds to an exposure for one pixel in an original resolution. The switch on/off statuses of the binary light source are controlled in the N times exposures for each pixel, on the basis of lighting rate information for converting the multilevel scales into a lighting rate in the N times exposures.

9 Claims, 13 Drawing Sheets

| | | GRADATION DATA | | | | |
|---|---|---|---|---|---|---|
| | | 4 | 3 | 2 | 1 | 0 |
| SUB ADDRESS | 0 | ON | ON | ON | ON | OFF |
| | 1 | ON | ON | ON | OFF | OFF |
| | 2 | ON | ON | OFF | OFF | OFF |
| | 3 | ON | OFF | OFF | OFF | OFF |

| a | b | c | d | e | f | g | h | i | j | |
|---|---|---|---|---|---|---|---|---|---|---|
| 0 | 1 | 2 | 3 | 4 | 3 | 2 | 1 | 0 | 1 | |

MAIN SCANNING DIRECTION →

| | | | | | | | | | | | | | | | | | |
|---|---|---|---|---|---|---|---|---|---|---|---|---|---|---|---|---|---|
|0a|0b|0c|0d|0e|0f|0g|0h|0i|0j|0k|0l|0m|0n|0o|0p|0q|0r|
|1a|1b|1c|1d|1e|1f|1g|1h|1i|1j|1k|1l|1m|1n|1o|1p|1q|1r|
|2a|2b|2c|2d|2e|2f|2g|2h|2i|2j|2k|2l|2m|2n|2o|2p|2q|2r|

⋮

↓ SUB SCANNING DIRECTION

MAIN SCANNING DIRECTION →

| | | | | | | | | | | | | | | | | | |
|---|---|---|---|---|---|---|---|---|---|---|---|---|---|---|---|---|---|
| | | | | | | | | | | | |0m|0n|0o|0p|0q|0r|
| | | | | | |0g|0h|0i|0j|0k|0l|1m|1n|1o|1p|1q|1r|
|0a|0b|0c|0d|0e|0f|1g|1h|1i|1j|1k|1l|2m|2n|2o|2p|2q|2r|
|1a|1b|1c|1d|1e|1f|2g|2h|2i|2j|2k|2l| | | | | | |
|2a|2b|2c|2d|2e|2f| | | | | | | | | | | | |

⋮

↓ SUB SCANNING DIRECTION

OPTICAL WRITING DEVICE, IMAGE FORMING APPARATUS, AND METHOD AND PROGRAM PRODUCT FOR CONTROLLING OPTICAL WRITING DEVICE

CROSS-REFERENCE TO RELATED APPLICATIONS

The present application claims priority to and incorporates by reference the entire contents of Japanese Patent Application No. 2010-199009 filed in Japan on Sep. 6, 2010.

BACKGROUND OF THE INVENTION

1. Field of the Invention

The present invention relates to an optical writing device, an image forming apparatus, and a method and program product for controlling the optical writing device. More particularly, the present invention relates to controlling an optical writing device capable of forming/outputting an image on the basis of image data in which each pixel is represented by multilevel data.

2. Description of the Related Art

In recent years, digitalization of information is a trend and this trend is likely to be further promoted. Therefore, there is indispensable an image forming apparatuses such as a printer and a facsimile machine for outputting the digitalized information, as well as an image forming apparatus such as scanner for digitalizing information from analog documents. Such an image forming apparatus is often provided with an image pickup function, an image forming function, a communication function and the like, so that the apparatus can be configured as a multifunction peripheral that is usable as a printer, a facsimile machine, a scanner, and a copier.

Among these image forming apparatuses, an electrophotographic image forming apparatus is widely used as the image forming apparatus for outputting the digitalized information. In such an electrophotographic image forming apparatus, a photosensitive element is optically exposed to form an electrostatic latent image. And, the electrostatic latent image is developed with a developer such as toner or the like to form a toner image. And, the toner image is transferred to a sheet such as paper to be outputted.

As for the electrophotographic image forming apparatus, there are known two types of optical writing devices, an LD (Laser Diode) raster optical system type and an LEDA (Light Emitting Diode Array) head type. In the LEDA head type, an LED array chip in which a plurality of light sources are aligned in line is used for exposing the photosensitive element for each main scanning line. As the LED light source, there are known two types of light sources, a binary controlled light source (hereinafter referred to as "binary head") for controlling two statuses, "a switch on status" and "a switch off status", and a multilevel controlled light source (hereinafter referred to as "multihead") capable of realizing a gradation by changing the emission intensity.

However, in the multilevel controlled light source, the emission intensity may vary among the plurality of light sources because of the manufacturing tolerance or the like. And, the variation of the emission intensity may induce the variation of the exposure intensity on the photosensitive element, and thereby the variation of the image density. Therefore, under existing conditions, the binary head is often used as the light source of the optical writing device.

As a method of realizing a gradation expression in the optical writing device using the LED light source, there is proposed a method of dividing a main scanning line per pixel into a plurality of sub lines, and setting different exposure energies for each sub line, and selecting the sub line to be turned on in accordance with the gradation value of each pixel (for example, Japanese Patent Application Laid-open No. 2007-245537).

Even in a case that the binary head is used for the LED light source of the optical writing device, there is need to form and output an image including the gradation expression such as grayscale or the like. In a case that a controller of the image forming apparatus is configured in accordance with the optical writing device, a function for realizing the gradation expression with the binary head may be mounted on the controller side. Therefore, there is no need to arrange a special configuration on the optical writing device side.

On the other hand, in a case that the controller and the optical writing device of the image forming apparatus are designed independently of each other, the function for realizing the gradation expression with the binary head needs to be mounted on the optical writing device side, in order to provide the optical writing device applicable to various types of controllers. In a case that the method disclosed by Japanese Patent Application Laid-open No. 2007-245537 is employed for example, however, there is need to provide a plurality of line memories for each sub line, and to control the exposure intensity for each sub line. Thereby, the control system becomes complicated, resulting in increased circuit size or manufacturing cost.

SUMMARY OF THE INVENTION

It is an object of the present invention to at least partially solve the problems in the conventional technology.

According to an aspect of the present invention, there is provided an optical writing device that forms an electrostatic latent image on a photosensitive element with a binary light source capable of controlling two statuses which are a switch on status and a switch off status. The device includes a pixel information acquiring unit that acquires multilevel pixel information in which one pixel is expressed in multilevel scales, the multilevel pixel information being information of each pixel for forming an image as the electrostatic latent image, a line pixel information storing unit that stores the acquired multilevel pixel information for each main scanning line, and a light emission control unit that optically exposes the photosensitive element by controlling the binary light source on the basis of the stored multilevel pixel information. The light emission control unit exposes the photosensitive element with the binary light source with a period corresponding to N-fold in a sub scanning direction resolution of the stored multilevel pixel information, wherein N is a positive integer, so that the N times exposures corresponds to an exposure for one pixel in the original resolution. The switch on status and the switch off status of the binary light source are controlled in the N times exposures with the binary light source for each pixel, on the basis of lighting rate information, the lighting rate information being for converting the multilevel scales into a lighting rate in the N times exposures.

According to an aspect of the present invention, there is provided an image forming apparatus includes the optical writing device mentioned above.

According to an aspect of the present invention, there is provided a method for controlling an optical writing device that forms an electrostatic latent image on a photosensitive element with a binary light source capable of controlling two statuses which are a switch on status and a switch off status. The method includes acquiring multilevel pixel information in which one pixel is expressed in multilevel scales, the multilevel pixel information being information of each pixel for forming an image as the electrostatic latent image, and storing the acquired multilevel pixel information in a storage medium for each main scanning line, and exposing the photosensitive element with the binary light source with a period corresponding to N-fold in a sub scanning direction resolution of the stored multilevel pixel information (N is a positive integer), so that the N times exposures corresponds to an exposure for one pixel in the original resolution. The method further includes acquiring a control value to control the switch on status and the switch off status of the binary light source, in controlling the binary light source in the N times exposures for each pixel, on the basis of lighting rate information, the lighting rate information being for converting the multilevel scales into a lighting rate in the N times exposures.

According to an aspect of the present invention, there is provided a computer program product comprising a non-transitory computer-readable medium having computer-readable program codes embodied in the medium for controlling an optical writing device that forms an electrostatic latent image on a photosensitive element with a binary light source capable of controlling two statuses which are a switch on status and a switch off status. The program codes when executed causing a computer to execute: acquiring multilevel pixel information in which one pixel is expressed in multilevel scales, the multilevel pixel information being information of each pixel for forming an image as the electrostatic latent image, and storing the acquired multilevel pixel information in a storage medium for each main scanning line; and exposing the photosensitive element with the binary light source with a period corresponding to N-fold in a sub scanning direction resolution of the stored multilevel pixel information (N is a positive integer), so that the N times exposures corresponds to an exposure for one pixel in the original resolution; and acquiring a control value to control the switch on status and the switch off status of the binary light source, in controlling the binary light source in the N times exposures for each pixel, on the basis of lighting rate information, the lighting rate information being for converting the multilevel scales into a lighting rate in the N times exposures.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

First Embodiment

An exemplary embodiment of the present invention is explained in detail below with reference to the accompanying drawings. In the present embodiment, a multifunction peripheral (MFP) is described as an example of an image forming apparatus. The image forming apparatus according to the present embodiments is an electrophotographic MFP, and the gist of the embodiments is a mode of skew correction made in an optical writing device for forming an electrostatic latent image on a photosensitive element. Incidentally, the image forming apparatus does not have to be an MFP; for example, the image forming apparatus can be a copier, a printer, a facsimile machine, and the like.

Figure 1:
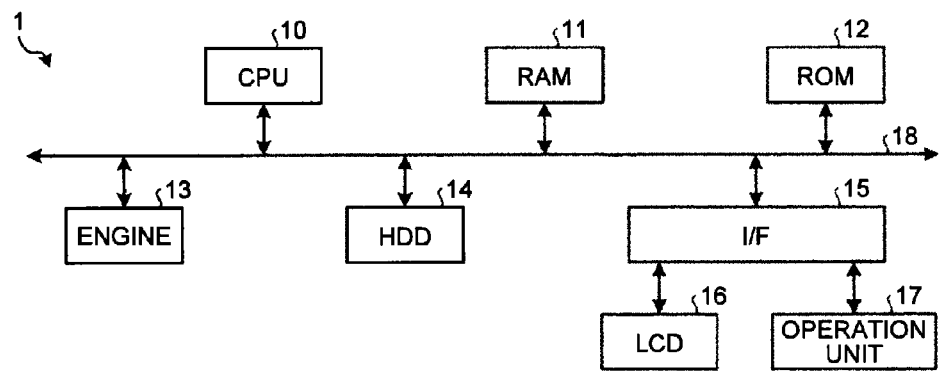
FIG. 1 is a block diagram showing a hardware configuration of an image forming apparatus according to a first embodiment of the present invention.

FIG. 1 is a block diagram showing a hardware configuration of an image forming apparatus 1 according to the first embodiment of the present invention. As shown in FIG. 1, the image forming apparatus 1 according to the present embodiment has an engine which performs an image formation, as well as a configuration same as that of a general server or a general information processing terminal such as a personal computer (PC). Namely, the image forming apparatus 1 according to the present embodiment includes a central processing unit (CPU) 10, a random access memory (RAM) 11, a read-only memory (ROM) 12, an engine 13, a hard disk drive (HDD) 14, and an interface (I/F) 15, which are connected to one another via a bus 18. Furthermore, a liquid crystal display (LCD) 16 and an operation unit 17 are connected to the I/F 15.

The CPU 10 is a computing means, and controls the entire operation of the image forming apparatus 1. The RAM 11 is a volatile storage medium capable of reading and writing information at a high speed, and is used as a work area of the CPU 10 when the CPU 10 processes information. The ROM 12 is a read-only nonvolatile storage medium, and stores therein a program such as firmware. The engine 13 is a mechanism which actually performs image formation in the image forming apparatus 1.

The HDD 14 is a nonvolatile storage medium capable of reading and writing information. The HDD 14 stores therein an operating system (OS), various control programs and application programs, and the like. The I/F 15 connects the bus 18 to various hardware and a network, etc., and controls the connection. The LCD 16 is a visual user interface provided to allow a user to check a status of the image forming apparatus 1. The operation unit 17 is a user interface, such as a keyboard and a mouse, provided to allow a user to input information to the image forming apparatus 1.

In such a hardware configuration, a program stored in the ROM 12, the HDD 14, or a recording medium such as an optical disk (not shown) is loaded into the RAM 11, and the CPU 10 performs an operation in accordance with the program, thereby making up a software control unit. A function block which implements functions of the image forming apparatus 1 according to the present embodiment is composed of a combination of the software control unit made up in this way and the hardware.

Figure 2:
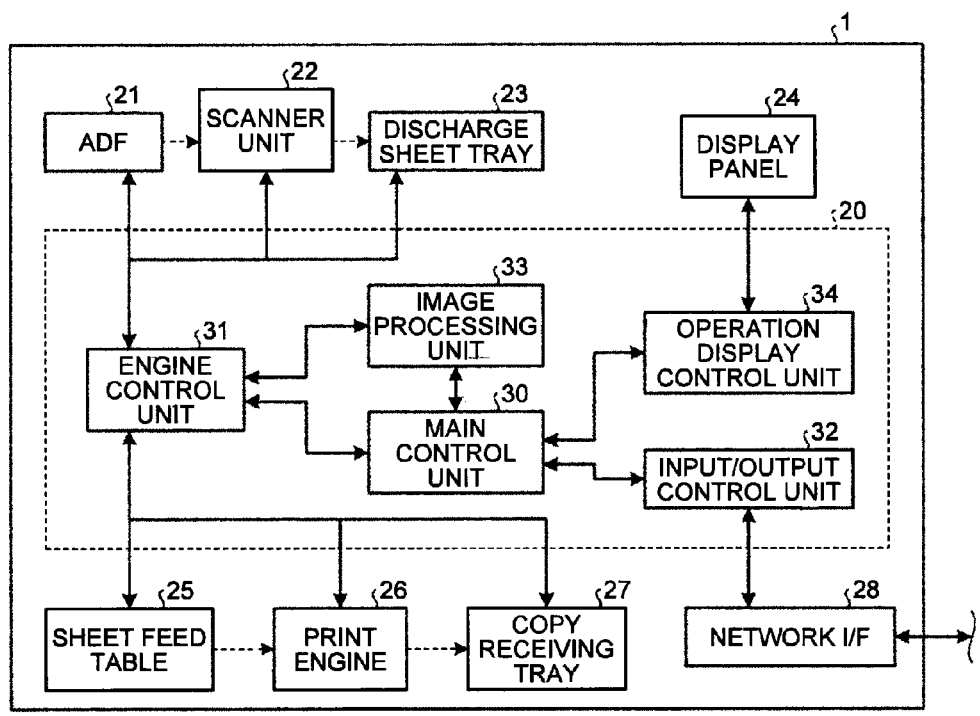
FIG. 2 is a diagram showing a functional configuration of the image forming apparatus according to the first embodiment of the present invention.

Subsequently, a functional configuration of the image forming apparatus 1 according to the present embodiment is explained with reference to FIG. 2. FIG. 2 is a block diagram showing the functional configuration of the image forming apparatus 1 according to the present embodiment. As shown in FIG. 2, the image forming apparatus 1 according to the present embodiment includes a controller 20, an auto document feeder (ADF) 21, a scanner unit 22, a discharge sheet tray 23, a display panel 24, a sheet feed table 25, a print engine 26, a copy receiving tray 27, and a network I/F 28.

The controller 20 includes a main control unit 30, an engine control unit 31, an input/output control unit 32, an image processing unit 33, and an operation display control unit 34. As shown in FIG. 2, the image forming apparatus 1 according to the present embodiment is configured as an MFP having the scanner unit 22 and the print engine 26. Incidentally, in FIG. 2, electrical connections are indicated by solid arrows, and the flow of a sheet is indicated by dashed arrows.

The display panel 24 is an output interface for visually displaying thereon a status of the image forming apparatus 1 and also is an input interface (an operation unit) used as a touch panel when a user directly operates the image forming apparatus 1 or inputs information to the image forming apparatus 1. The network I/F 28 is an interface provided to allow the image forming apparatus 1 to communicate with other devices via a network; an Ethernet (registered trademark) interface or a universal serial bus (USB) interface is used as the network I/F 28.

The controller 20 is composed of a combination of software and hardware. Specifically, control programs, such as firmware, stored in the ROM 12 or a nonvolatile memory and the HDD 14 or a nonvolatile recording medium such as an optical disk are loaded into a volatile memory (hereinafter, referred to as a "memory") such as the RAM 11, and a software control unit made up in accordance with the control of the CPU 10 and hardware, such as an integrated circuit, compose the controller 20. The controller 20 serves as a control unit for controlling entirely the image forming apparatus 1.

The main control unit 30 takes a role in controlling the units included in the controller 20, and gives an instruction to each unit in the controller 20. The engine control unit 31 serves as a drive means for controlling or driving the print engine 26, the scanner unit 22, and the like. The input/output control unit 32 inputs a signal or instruction input via the network I/F 28 to the main control unit 30. Furthermore, the main control unit 30 controls the input/output control unit 32 and accesses another device via the network I/F 28.

The image processing unit 33 generates drawing information on the basis of print information included in an input print job in accordance with the control by the main control unit 30. The drawing information is information for drawing an image to be formed in the image forming operation by the print engine 26, which is an image forming unit. Furthermore, the print information included in the print job is image information converted by a printer driver installed in an information processing apparatus, such as a PC, into a form recognizable by the image forming apparatus 1. The operation display control unit 34 displays information on the display panel 24 or notifies the main control unit 30 of information input via the display panel 24.

When the image forming apparatus 1 operates as a printer, first, the input/output control unit 32 receives a print job via the network I/F 28. The input/output control unit 32 transfers the received print job to the main control unit 30. When receiving the print job, the main control unit 30 controls the image processing unit 33 and causes the image processing unit 33 to generate the drawing information on the basis of the print information included in the print job.

When the drawing information has been generated by the image processing unit 33, the engine control unit 31 performs the image formation on a sheet fed from the sheet feed table 25 on the basis of the generated drawing information. Namely, the print engine 26 serves as an image forming unit. The sheet on which an image has been formed by the print engine 26 is discharged onto the copy receiving tray 27.

When the image forming apparatus 1 operates as a scanner, in accordance with an instruction to execute scanning made through user operation on the display panel 24 or input from an external device, such as a PC, via the network I/F 28, the operation display control unit 34 or the input/output control unit 32 outputs a scanning execution signal to the main control unit 30. The main control unit 30 controls the engine control unit 31 on the basis of the received scanning execution signal.

The engine control unit 31 drives the ADF 21 to feed an original to be imaged, which has been set in the ADF 21, to the scanner unit 22. Furthermore, the engine control unit 31 drives the scanner unit 22 to take an image of the original fed from the ADF 21. In a case that no original has been set in the ADF 21 and a user directly sets an original in the scanner unit 22, the scanner unit 22 takes an image of the set original in accordance with the control of the engine control unit 31. Namely, the scanner unit 22 operates as an imaging unit.

In the imaging operation, an imaging element, such as a CCD, included in the scanner unit 22 optically scans the original, and image pickup information is generated on the basis of the optical information. The engine control unit 31 transfers the image pickup information generated by the scanner unit 22 to the image processing unit 33. The image processing unit 33 generates the image information on the basis of the image pickup information received from the engine control unit 31 in accordance with the control of the main control unit 30. The image information generated by the image processing unit 33 is stored in a storage medium mounted in the image forming apparatus 1, such as an HDD 40. Namely, the scanner unit 22, the engine control unit 31, and the image processing unit 33 serve as an original reading unit in cooperation with one another.

The image information generated by the image processing unit 33 is kept in the HDD 40 or the like as it is or is transmitted to an external device via the input/output control unit 32 and the network I/F 28 in accordance with an instruction from a user. Namely, the ADF 21 and the engine control unit 31 serve as an image input unit.

When the image forming apparatus 1 operates as a copier, the image processing unit 33 generates the drawing information on the basis of the image pickup information that the engine control unit 31 has received from the scanner unit 22 or the image information generated by the image processing unit 33. In the same manner as in the case of the printer operation, on the basis of the drawing information, the engine control unit 31 drives the print engine 26.

Figure 3:
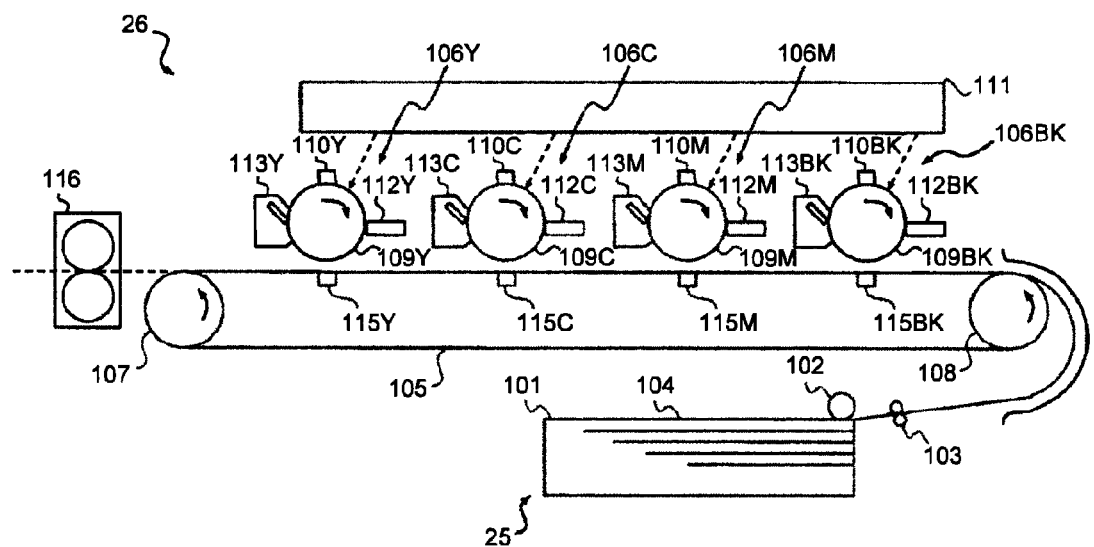
FIG. 3 is a diagram showing a configuration of a print engine according to the first embodiment of the present invention.

Subsequently, a configuration of the print engine 26 according to the present embodiment is explained with reference to FIG. 3. As shown in FIG. 3, the print engine 26 according to the present embodiment has a configuration that a plurality of image forming units 106 for each color are aligned along a conveying belt 105 which is an endless moving body. This configuration is a so-called tandem type configuration. Namely, the plurality of image forming units (electrophotographic process units) 106BK, 106M, 106C, and 106Y are arranged in this order from the upstream of the conveying belt 105 in a conveying direction along the conveying belt 105 that conveys a sheet (an example of a recording medium) 104 which has been picked up from a sheet tray 101 one by one and fed by a sheet feed roller 102 and a separation roller 103.

The plurality of image forming units 106BK, 106M, 106C, and 106Y only differ from one another in their colors of toner images to be formed and have the same internal configuration. The image forming unit 106BK forms a black image, the image forming unit 106M forms a magenta image, the image forming unit 106C forms a cyan image, and the image forming unit 106Y forms a yellow image. In the description below, the image forming unit 106BK will be explained specifically. Since the other image forming units 106M, 106C, and 106Y are similar to the image forming unit 106BK, for each element of the image forming units 106M, 106C, and 106Y, a reference numeral distinguished by "M", "C", or "Y" respectively will be used in the drawing in place of "BK" used for each element of the image forming unit 106BK, and explanation thereof will be omitted.

The conveying belt 105 is an endless belt supported by a drive roller 107, which is driven to rotate, and a driven roller 108. The drive roller 107 is driven to rotate by a drive motor (not shown). The drive motor, the drive roller 107, and the driven roller 108 serve as a drive means for driving the conveying belt 105, which is an endless moving body, to move.

In image formation, the top sheet 104 of those contained in the sheet tray 101 is sequentially fed, and attracted to the conveying belt 105 by the electrostatic attraction and conveyed to the first image forming unit 106BK in accordance with the rotation of the conveying belt 105, and in the image forming unit 106BK, a black toner image is transferred onto the sheet 104 on the conveying belt 105. Namely, the conveying belt 105 serves as a conveying body for conveying a sheet onto which an image is to be transferred.

The image forming unit 106BK is composed of a photosensitive drum 109BK as a photosensitive element, as well as a charger 110BK, an optical writing device 111, a developing unit 112BK, a photosensitive element cleaner (not shown), and a static eliminator 113BK and so on, which are arranged around the photosensitive drum 109BK. The optical writing device 111 is configured to optically expose the photosensitive drums 109BK, 109M, 109C, and 109Y (hereinafter, collectively referred to as "photosensitive drum(s) 109"), thereby forming electrostatic latent images on the respective photosensitive drums 109.

In the image formation, the outer circumferential surface of the photosensitive drum 109BK is uniformly charged by the charger 110BK in the dark, and then exposed to an irradiation light corresponding to a black image which is emitted from the optical writing device 111, and an electrostatic latent image is formed on the photosensitive drum 109BK. The developing unit 112BK develops the electrostatic latent image into a visible image using black toner, and a black toner image is formed on the photosensitive drum 109BK.

The toner image is transferred onto the sheet 104 at the position where the photosensitive drum 109BK and the sheet 104 on the conveying belt 105 come in contact with each other (the transfer position) by the action of a transfer unit 115BK. As a result, an image formed of the black toner is formed on the sheet 104. After the transfer of the toner image onto the sheet 104, unwanted toner remaining on the outer circumferential surface of the photosensitive drum 109BK is removed by the photosensitive element cleaner, and static electricity is eliminated from the outer circumferential surface of the photosensitive drum 109BK by the static eliminator 113BK to make the photosensitive drum 109BK ready for next image formation.

The sheet 104 onto which the black toner image has been transferred by the image forming unit 106BK as described above is conveyed to the next image forming unit 106M by the conveying belt 105. In the image forming unit 106M, by the same process as the image forming process performed in the image forming unit 106BK, a magenta toner image is formed on the photosensitive drum 109M, and the toner image is transferred onto the sheet 104 so that the magenta toner image is superimposed on the black image formed on the sheet 104.

The sheet 104 is further conveyed to the next image forming units 106C and 106Y, and by the same operation, a cyan toner image formed on the photosensitive drum 109C and a yellow toner image formed on the photosensitive drum 109Y are superimposed and transferred onto the sheet 104. In this manner, a full-color image is formed on the sheet 104. The sheet 104 on which the full-color superimposed image has been formed is separated from the conveying belt 105, and the image is fixed on the sheet 104 by a fixing unit 116, and after that, the sheet 104 is discharged to the outside of the image forming apparatus.

Figure 4:
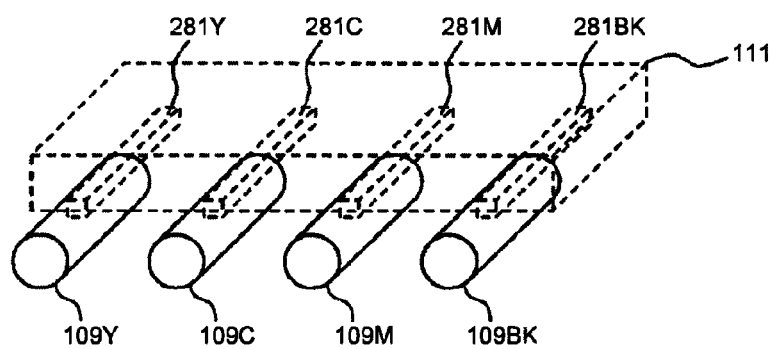
FIG. 4 is a diagram schematically showing a configuration of an optical writing device according to the first embodiment of the present invention.

Subsequently, the optical writing device 111 according to the present embodiment is explained. FIG. 4 is a diagram showing an arrangement of the optical writing device 111 and the photosensitive drums 109 according to the present embodiment. As shown in FIG. 4, irradiation lights irradiated to the photosensitive drums 109BK, 109M, 109C, and 109Y are emitted from LED arrays (LEDAs) 281BK, 281M, 281C, and 281Y (hereinafter, collectively referred to as "LEDA 281") which are light sources, respectively.

The LEDA 281 is configured in such a manner that a plurality of LEDs, which are light emitting elements, are aligned in the main scanning direction of the photosensitive drum 109. The control unit included in the optical writing device 111 controls the switch on status and the switch off status of each LED aligned in the main scanning direction, on the basis of data of an image to be outputted. Thereby, the surface of the photosensitive element 109 is selectively and optically exposed to form the electrostatic latent image. Namely, by controlling the switch on status and the switch off status of the LEDA 281 one time, the electrostatic latent image corresponding to one line of an image to be outputted in the main scanning direction is formed. Incidentally, the LEDA 281 according to the present embodiment is a binary light source capable of merely controlling the switch on status and the switch off status thereof.

Figure 5:
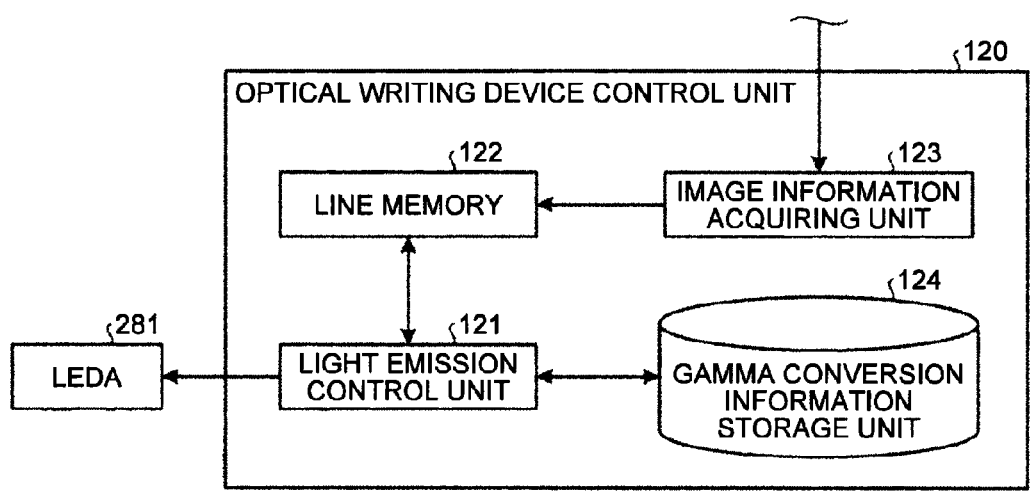
FIG. 5 is a block diagram showing a control unit of the optical writing device according to the first embodiment of the present invention.

Subsequently, a control block of the optical writing device 111 according to the present embodiment is explained with reference to FIG. 5. FIG. 5 is a diagram showing a functional configuration of an optical writing device control unit 120 for controlling the optical writing device 111 according to the present embodiment and a connecting relationship between the optical writing device control unit 120 and the LEDA 281. As shown in FIG. 5, the optical writing device control unit 120 according to the present embodiment includes a light emission control unit 121, a line memory 122, an image information acquiring unit (pixel information acquiring unit) 123, and a gamma conversion information storing unit 124.

Incidentally, the optical writing device 111 according to the present embodiment includes an information processing mechanism like the CPU 10, the RAM 11, and a storage medium such as the ROM 12 as described in FIG. 1, and in the same manner as the controller 20 of the image forming apparatus 1, the optical writing device control unit 120 as shown in FIG. 5 is composed of a combination of a software control unit, which is made up in such a way that a control program stored in the storage medium such as the ROM 12 is loaded into the RAM 11 and the CPU 10 performs an operation in accordance with the program, and hardware.

The light emission control unit 121 is a light source control unit which controls light emission of the LEDA 281 on the basis of the pixel information stored in the line memory 122, on the basis of the image information input from the engine control unit 31 of the controller 20. The light emission control unit 121 controls the switch on status and the switch off status of the light emission control unit 121 at every one scanning line in accordance with a sub scanning direction clock.

The line memory 122 is a storage medium for storing therein the pixel information at every main scanning line of the image, in accordance with the image information input from the engine control unit 31. Namely, the line memory 122 serves as a line pixel information storing unit. The light emission control unit 121 reads out the pixel information stored in the line memory 122 on a line-by-line basis, and controls the switch on status and the switch off status of the LEDA 281.

Figure 6:
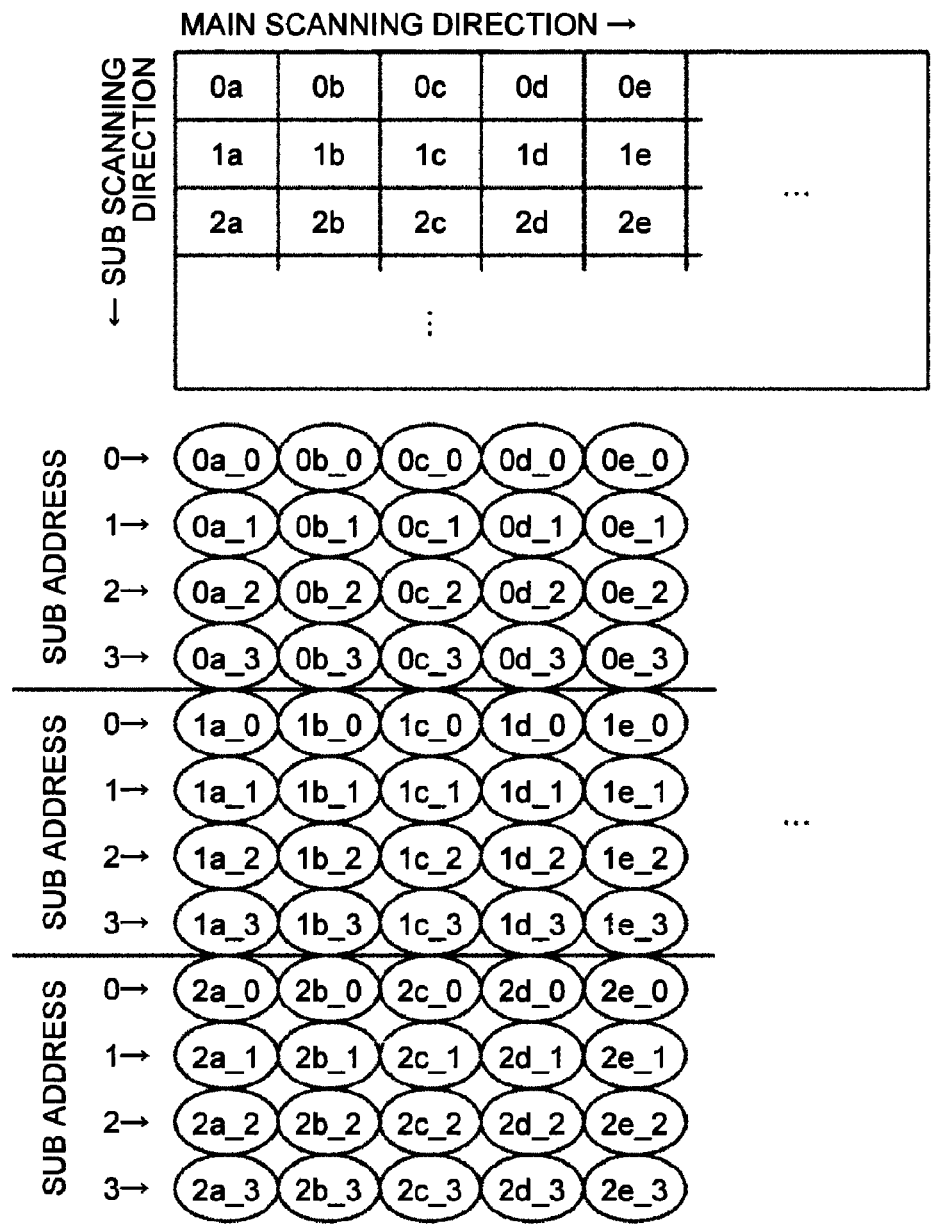
FIG. 6 is a diagram showing pixel information stored in a line memory and pixels to be output according to the first embodiment of the present invention.

FIG. 6 is a diagram showing a relation between the reading sequence of pixel data (pixel information) stored in the line memory 122 and an actually-drawn image. The upper part of FIG. 6 shows the reading sequence of pixel data (pixel information) stored in the line memory 122. The pixel data (pixel information) stored in the line memory 122 is sequentially read out in the order of "0a", "0b", "0c", . . . as for the pixel data (pixel information) of the first line, "1a", "1b", "1c", . . . as for the pixel data (pixel information) of the second line, "2a", "2b", "2c", . . . as for the pixel data (pixel information) of the third line, and so on. The lower part of FIG. 6 shows an example of an image to be drawn on the basis of the pixel data (pixel information) read out from the line memory 122. In the figure, each pixel that is drawn in accordance with the corresponding pixel data (pixel information) is circled.

In the present embodiment, as shown in FIG. 6, the image drawing is performed in such a manner that the pixel data (pixel information) of one scanning line is divided into four lines. In other words, the light emission control unit 121 controls the switch on status and the switch off status of the LEDA 281, with a period corresponding to N-fold in a sub scanning direction resolution of the pixel data (pixel information) input to the optical writing device control unit 120.

As shown in FIG. 6, once the light emission control unit 121 reads out the pixel data (pixel information) of one main scanning line, the control unit 121 divides an area of one pixel into four lines (i.e. four sub lines) in the sub scanning direction. Thus, a sub pixel is depicted by controlling the switch on status and the switch off status of the LEDA 281 for each sub line. Each sub line and each sub pixel are identified by sub addresses from 0 to 3, such as "0a_0", "0a_1", "0a_2", and "0a_3". The light emission control unit 121 controls the switch on status and the switch off status of the LEDA 281, while counting the sub lines in drawing the one main scanning line. That is, the light emission control unit 121 stores the count values of the sub lines.

Incidentally, in FIG. 6, for ease of illustration, each pixel composed of four sub pixels, for example "1a_0" to "1a_3", is depicted in such a manner that the sub scanning direction is longer than the main scanning direction. However, an actual rate of the main scanning direction to the sub scanning direction of one pixel is 1:1.

The image information acquiring unit 123 acquires the image information input from the controller 20 and stores the information of pixels for forming an image into the line memory 122 for each main scanning line. In the present embodiment, the image information acquired by the image information acquiring unit 123 is the image information in which each pixel is expressed with densities in multilevel scales. The pixel information stored into the line memory 122 by the image information acquiring unit 123 is the multilevel pixel information including the information of densities in multilevel scales.

Figures 7, 8:
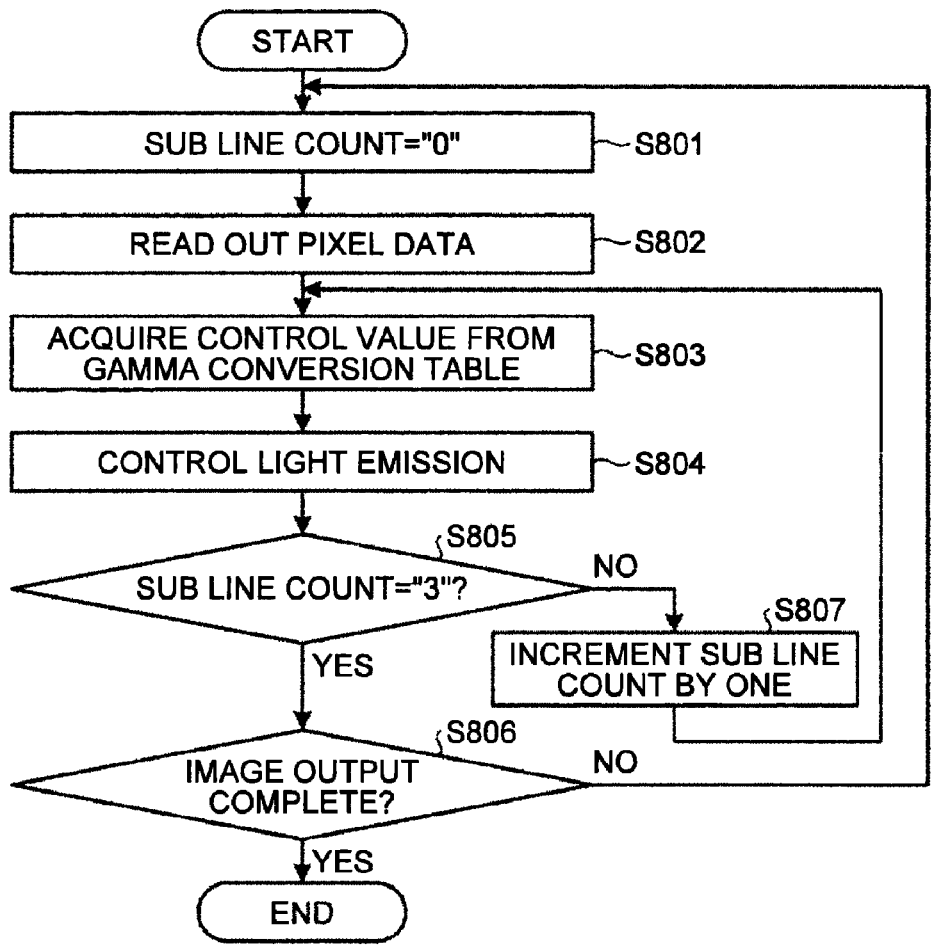
FIG. 7 is a table showing an example of information stored in a gamma conversion information storing unit according to the first embodiment of the present invention.
FIG. 8 is a flow chart showing an operation of a control unit of an optical writing device according to the first embodiment of the present invention.

The gamma conversion information storing unit 124 stores therein information of a gamma conversion table for converting the multilevel pixel information into the binary information, i.e., the information that indicates the switch on status and the switch off status of the light source corresponding to each pixel. FIG. 7 shows the information of the gamma conversion table according to the present embodiment. As shown in FIG. 7, the gamma conversion table according to the present embodiment is expressed in a matrix made of the sub address explained for FIG. 6 and the multilevel scale value (gradation data) in the above-mentioned multilevel pixel information. The information indicating which the switch on status or the switch off status is stored for each combination of the multilevel scale values and the sub addresses. In the table, the switch on status is represented by "ON" and the switch off status is represented by "OFF".

Namely, the gamma conversion table is the information that stores the control value to control the switch on status and the switch off status of the LEDA 281 as the binary light source, for each combination of the multilevel scale value in the multilevel pixel information and the sequence of a plurality times of exposures for depicting one pixel and one main scanning line (four exposures in the present embodiment).

For example, if the multilevel scale value indicating the gradation of a certain pixel is "3", the LEDAs 281 of the sub addresses 0 to 2 are switched on and the LEDA 281 of the sub address 3 is switched off, when depicting the pixel corresponding to the multilevel pixel information. Thus, the density corresponding to the multilevel scale value 3 is expressed by the rate of the switch on status and the switch off status among four sub pixels.

Subsequently, the operation of the light emission control unit 121 according to the present embodiment is explained.

FIG. 8 is a flow chart showing the operation of the light emission control unit 121 according to the present embodiment. The light emission control unit 121 resets the sub line count to "0" (Step S801), and reads out pixel data (pixel information) from the line memory 122 (Step S802), once the image data is input to the optical writing device control unit 120 from the controller 20 of the image forming apparatus 1, and the multilevel pixel information is stored in the line memory 122.

Once the pixel data (pixel information) is read out from the line memory 122, the light emission control unit 121 acquires the control value to control the switch on status and the switch off status defined by the sub line count value and the multilevel scale value (gradation data) in the multilevel pixel information, for each pixel in each main scanning line, with reference to the gamma conversion table stored in the gamma conversion information storing unit 124 (Step S803). Then, the light emission control unit 121 controls the light emission of the LEDA 281 on the basis of the acquired control values (Step S804).

Furthermore, the light emission control unit 121 checks the sub line count value (Step S805). If the sub line count value is 3 (YES at Step S805), which means all sub lines are depicted for one main scanning line, it checks whether or not the target image is completely output (Step S806). Then, if the target image is completely output (YES at Step S806), the process is terminated. If the target image is not completely output (NO at Step S806), the process from S801 is repeated.

On the other hand, if the sub line count value is not 3 (NO at Step S805), the light emission control unit 121 increments the sub line count value by one (Step S807). And the process from S803 is repeated. Thus, the control value of the different sub line is read out at the subsequent step S803, so that the light emission control is performed. In this way, the light emission control is performed by the light emission control unit 121 according to the present embodiment.

Figures 9A, 9B:
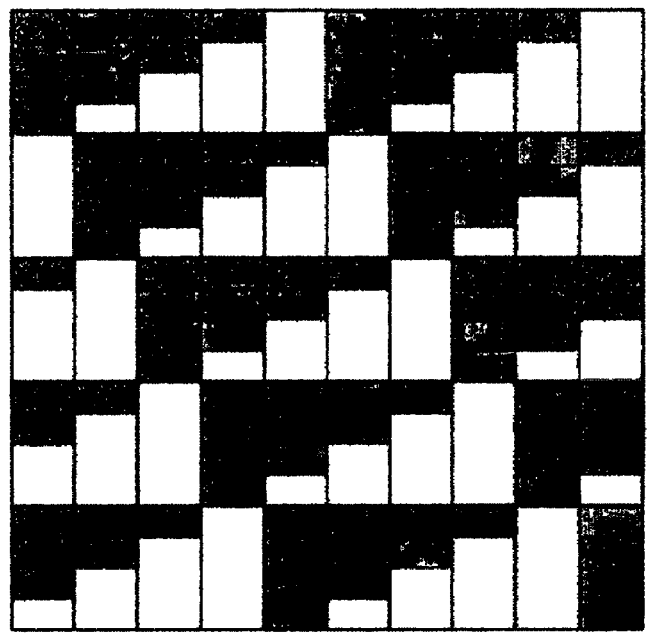
FIGS. 9A and 9B are diagrams showing an example of an image actually drawn by the optical writing device according to the first embodiment of the present invention.

Subsequently, an example of the image depicted according to the process shown in FIG. 8 will be explained with reference to FIGS. 9A and 9B. FIG. 9A shows an image expressed by the multilevel pixel information. If the gradation image made of pixels having the multilevel scale values 0 to 4 as shown in FIG. 9A is depicted by the optical writing device 120 according to the present embodiment, the image is obtained in which the gradation (i.e. the multilevel scale) is expressed by the binary sub pixels as shown in FIG. 9B.

In this manner, when the multilevel pixel information is input from the controller 20 of the image forming apparatus 1, the optical writing device 111 according to the present embodiment defines four sub lines and four sub pixels by quadrupling the sub scanning direction resolution. Thereby, the gradation is expressed in five level scales with different proportion between the switch on/off statuses when depicting the four sub pixels. In this case, the line memory is not quadrupled in order to realize four sub lines. Instead, the switch on/off statuses of each sub pixel is determined on the basis of the count value of the sub line count, the gamma conversion table, and the original multilevel pixel information.

Thus, it is possible to avoid the increased cost in accordance with the increased line memories. Therefore, it is possible to realize the multilevel scaled expression in the optical writing device employing the binary head with a simplified configuration.

Incidentally, in the above embodiment, the explanation is made on the case that the sub scanning direction resolution is quadrupled. However, the sub scanning direction resolution may be tripled or less, or may be quintupled or more, so long as the modulation rate is a positive integral multiple. And, it is possible to obtain the same effect as the above embodiment when the modulation rate is a positive integral multiple.

Second Embodiment

In a second embodiment, there is described a case that the skew correction is performed in addition to the process described in the first embodiment. Incidentally, a component assigned the same reference numeral as that is in the first embodiment shall be identical or equivalent to the component in the first embodiment, and detailed description of the component is omitted.

In the optical writing device as described in the first embodiment, due to an installation error of the LEDA 281 or an installation error of LED chips in the LEDA 281, a tilted image is formed, i.e., a so-called skew occurs. Specifically, an electrostatic latent image is formed by exposing the photosensitive drum 109 to a light emitted from the LEDA 281; therefore, if the LEDA itself is tilted or the alignment direction of the LEDs in the LEDA 281 is tilted with respect to the main scanning direction of the photosensitive drum 109, the electrostatic latent image is also tilted in accordance with the tilted LED or LEDA. If the tilted electrostatic latent image is developed, a tilted image is formed. The main purpose of this embodiment is to avoid the skew problem by performing an appropriate correction.

Figures 10, 11:
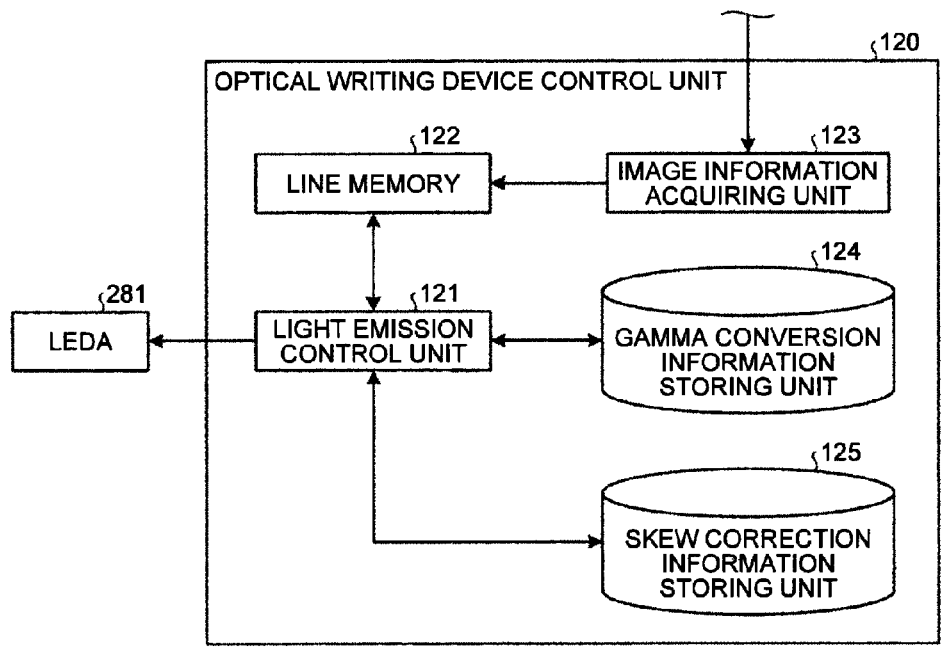
FIG. 10 is a block diagram showing a control unit of an optical writing device according to a second embodiment of the present invention.
FIG. 11 is a table showing an example of information stored in a skew correction information storing unit according to the second embodiment of the present invention.

FIG. 10 is a block diagram showing a functional configuration of the light emission control unit 121 according to the present embodiment. As shown in FIG. 10, the light emission control unit 121 according to the present embodiment further includes a skew correction information storing unit 125 in addition to the configuration shown in FIG. 5. The skew correction information storing unit 125 stores therein information on a skew correction amount, i.e., an amount of shift in the sub scanning direction for the entire main scanning line as shown in FIG. 11. Incidentally, "a", "b", "c", . . . in FIG. 11 correspond to "a", "b", "c", . . . in FIG. 6.

In the present embodiment, the skew correction is performed by shifting pixels in the sub scanning direction on the basis of the information stored in the skew correction information storing unit 125, when the light emission control unit 121 reads out the pixel information form the line memory 122. The fundamental concept of the skew correction is explained with reference to FIG. 12 and FIG. 13.

Figure 12:
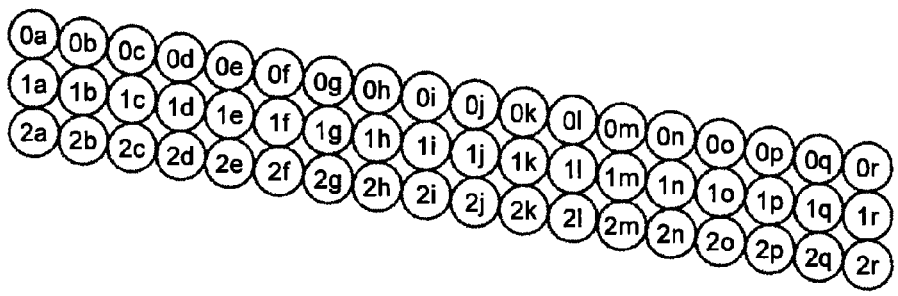
FIG. 12 is a diagram showing a concept of skew correction according to the second embodiment of the present invention.
Figure 13:
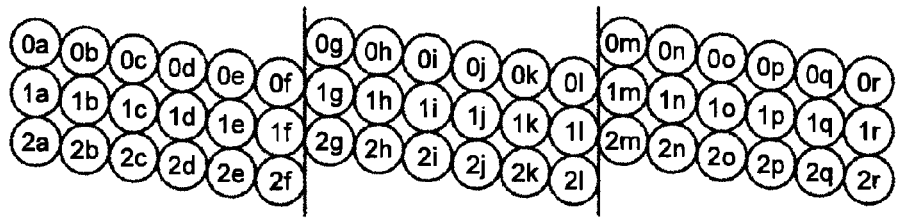
FIG. 13 is a diagram showing a concept of skew correction according to the second embodiment of the present invention.

FIG. 12 shows the relationship between the actually depicted image and the pixel data (pixel information) read out from the line memory 122, similar to FIG. 7. FIG. 12 also shows a status that the skew is occurred. In the example shown in FIG. 12, the skew of the light beam makes the image tilt downwardly from top left to bottom right in the figure. FIG. 13 shows a status that the skew appeared as in FIG. 12 is corrected. In the example shown in FIG. 13, as shown in the upper part of the figure, the pixel data (pixel information) read out from the line memory 122 is shifted in the sub scanning direction at every six pixels. Thereby, as shown in the lower part of the figure, the total amount of skew dislocation is reduced. Incidentally, the examples of FIGS. 12 and 13, one sub pixel is represented by one circle corresponding to one pixel data (pixel information), for the simplified explanation.

Figure 14A:
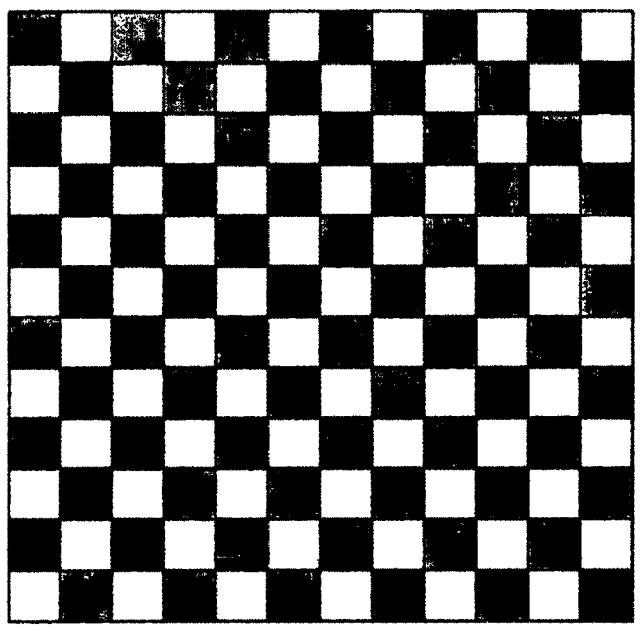
FIGS. 14A and 14B are diagrams showing a problem to be solved by skew correction according to the second embodiment of the present invention.
Figure 14B:
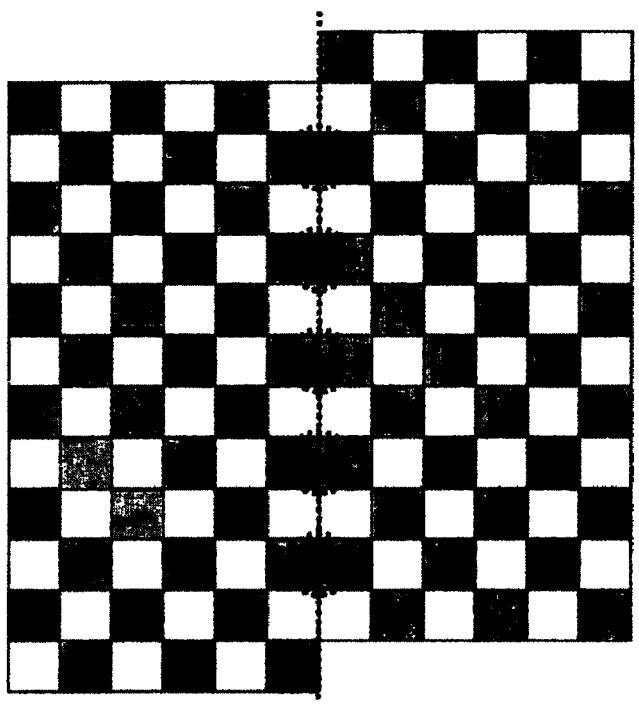

Next, an explanation will be made on an adverse effect in the case that the skew correction is made as shown in FIG. 13, with reference to FIGS. 14A and 14B. FIGS. 14A and 14B shows an example in which the shift correction is made on the image that is subjected to the dithering every other pixel in both the main scanning direction and the sub scanning direction. FIG. 14A shows a status before the correction and FIG.

14B shows a status after the correction. In FIG. 14B, the image is shifted at positions indicated by bold dotted lines.

As shown in FIG. 14B, if the correction is made similarly to the case of FIG. 13, pixels in the switch on status (colored pixels) are combined with each other, as well as pixels in the switch off status (solid color pixels), at positions where the image is shifted as shown by dotted circle in FIG. 14B. Thereby, the image density changes at these positions. As a result, a noise line in the sub scanning direction appears at positions where the image is shifted.

Figure 15A:
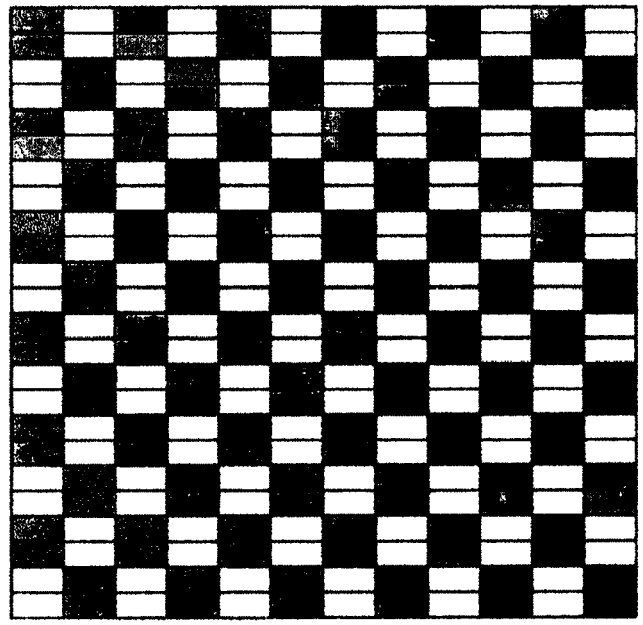
FIGS. 15A and 15B are diagrams showing a problem to be solved by skew correction according to the second embodiment of the present invention.
Figure 15B:
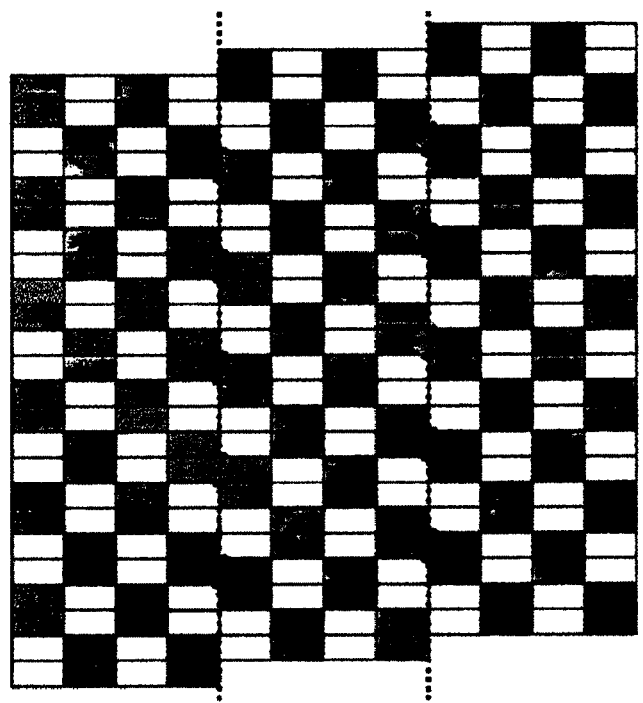

FIGS. 15A and 15B shows an example, in order to reduce the noise line that is explained with FIG. 14B, in which the sub scanning direction resolution is doubled, and the shift amount of pixels are reduced to half in the sub scanning direction, when the image is shifted. In this case, as shown in FIG. 15A, in order to double the sub scanning direction resolution of the image, the clock frequency for controlling the switch on status and the switch off status of the LEDA 281 is doubled, and the light emission control unit 121 reads out continuously twice the pixel data (pixel information) of one main scanning line from the line memory 122. That is, one main scanning line in the original resolution is depicted in twice.

Then, as shown by dotted circles in FIG. 15B, the number of shift is made twice, in order to obtain the total shift amount of one pixel in the case that the shift amount of the pixel in the sub scanning direction is reduced to half. Thereby, as shown by the dotted circles in FIG. 15B, the area where the pixels in the switch on status are combined with each other, or the area where the pixels in the switch off status are combined with each other is reduced to half at position where the image is shifted. As a result, it is possible to reduce a visual adverse effect such as the noise line.

Subsequently, the operation of the light emission control unit 121 according to the present embodiment is explained. In principle, the light emission control unit 121 according to the present embodiment also performs a process in the same manner as the flow chart shown in FIG. 8. However, at Steps S802 and S803 in FIG. 8, a process according to a shift correction amount is performed. First, the details of the process at Step S802 in the present embodiment are explained with reference to FIG. 16.

Figure 16:
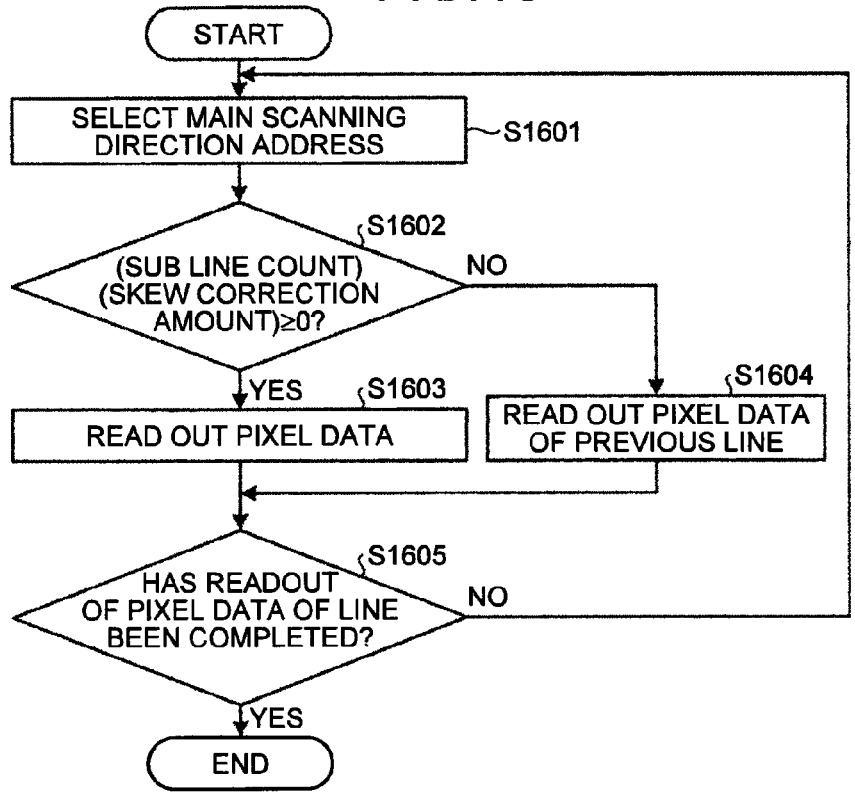
FIG. 16 is a flow chart showing an operation for reading out the pixel data (pixel information) according to the second embodiment of the present invention.

As shown in FIG. 16, in reading of image data, the light emission control unit 121 selects a main scanning direction address in the order of the main scanning line direction (Step S1601). The main scanning direction address means "a", "b", "c", . . . shown in FIG. 11 and the like. After selecting the main scanning direction address, the light emission control unit 121 acquires a skew correction amount corresponding to the main scanning direction address from the skew correction information storing unit 125, and calculates a value by subtracting the skew correction amount from a current sub line count value (Step S1602).

If the value calculated by subtracting the skew correction amount from the sub line count value is not a negative value (YES at Step S1602), the light emission control unit 121 reads out pixel data (pixel information) from the line memory 122 in order (Step S1603). On the other hand, if the value calculated by subtracting the skew correction amount from the sub line count value is a negative value (NO at Step S1602), the light emission control unit 121 reads out pixel data (pixel information) of the previous main scanning line from the line memory 122 (Step S1604).

Upon completion of the process at Step S1603 or S1604, the light emission control unit 121 checks whether readout of pixel data (pixel information) of the entire range of the main scanning lines has been completed (Step S1605). If it has not been completed (NO at Step S1605), the steps from Step S1601 are repeated; if it has been completed (YES at Step S1605), the process is terminated. In this manner, the light emission control unit 121 according to the present embodiment switches a main scanning line of which the pixel data (pixel information) is to be read out according to a skew correction amount.

Figure 17:
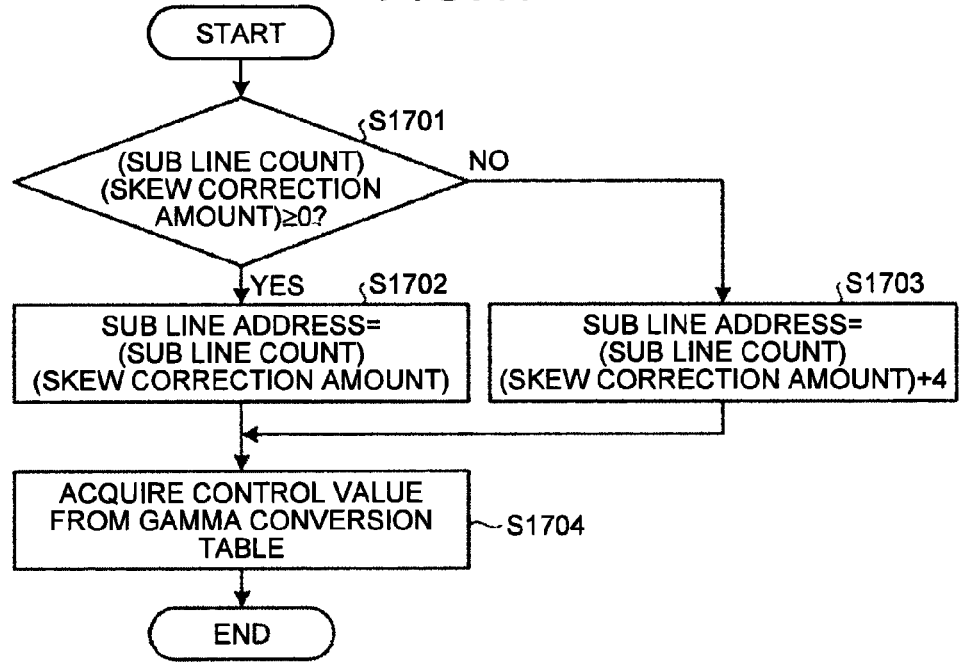
FIG. 17 is a flow chart showing an operation for acquiring a control value from a gamma conversion table according to the second embodiment of the present invention.

Subsequently, the details of the process at Step S803 in the present embodiment are explained with reference to FIG. 17. As shown in FIG. 17, in acquisition of a control value from the gamma conversion table, the light emission control unit 121 calculates a value by subtracting a skew correction amount from a current sub line count value (Step S1701). If the value calculated by subtracting the skew correction amount from the sub line count value is not a negative value (YES at Step S1701), the light emission control unit 121 uses the calculated value as a sub address (Step S1702).

On the other hand, if the value calculated by subtracting the skew correction amount from the sub line count value is a negative value (NO at Step S1701), the light emission control unit 121 sets a value, as a sub address, calculated by adding four to the obtained negative value (Step S1703). Upon completion of the process at Step S1702 or S1703, the light emission control unit 121 acquires a control value from the gamma conversion table on the basis of the determined sub address and the pixel data (pixel information) read through the process shown in FIG. 16 (Step S1704), and terminates the process.

Figure 18:
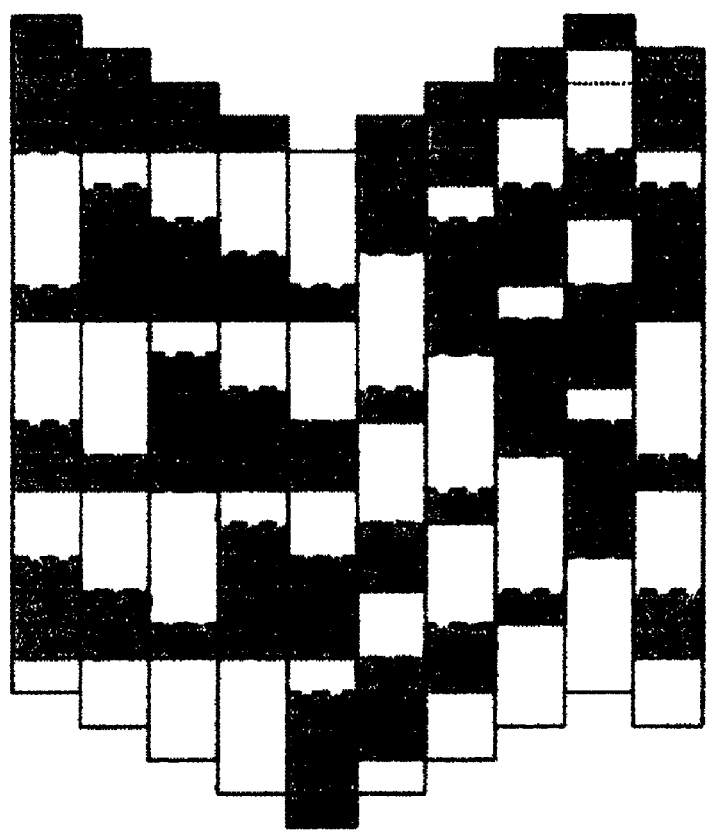
FIG. 18 is a diagram showing a mode of skew correction according to the second embodiment of the present invention.

Subsequently, an example of an image drawn through the processes shown in FIGS. 16 and 17 is shown in FIG. 18. FIG. 18 is a diagram showing a result of application of the skew correction amounts shown in FIG. 11 to the image information shown in FIG. 9A in the first embodiment. As shown in FIG. 18, pixels are shifted in the sub scanning direction according to the skew correction amounts shown in FIG. 11.

In this manner, in the present embodiment, even if skew correction is performed, the same function as in the first embodiment can be achieved, and gradation expression can be achieved in an optical writing device using a binary head with a simple configuration in the same manner as in the first embodiment.

In all embodiments including this embodiment, the sub scanning direction resolution is quadrupled, in order to realize the gradation expression with using the binary head. However, as explained for FIGS. 14A, 14B, 15A and 15B, the degradation of image due to the skew correction can be reduced by multiplying the sub scanning direction resolution of the image by a positive integer, when the skew correction is made by shifting the image in the sub scanning direction. Therefore, the process to multiple the sub scanning direction resolution contributes to two purposes, (i) the realization of the gradation expression, and (ii) the reduction of the image degradation due to skew correction, in this embodiment. Thereby, this embodiment enables the efficient process.

Incidentally, in the above embodiment, the explanation is made on the case that the pattern of the switch on status and the switch off status corresponding to the multilevel scale data of each pixel is fixed, on the basis of the gamma conversion table shown in FIG. 7. However, the pattern of the switch on status and the switch off status corresponding to the multilevel scale data of each pixel may be vary in order to reduce the degradation of the image due to the change of the image density, as explained for FIGS. 14A, 14B, 15A and 15B.

For example, such an embodiment can be realized as follows. That is, the gamma conversion information storing unit 124 stores the gamma conversion table in which the pattern of the switch on/off statuses of each sub address is set, in order to reduce the density change when the image is shifted, for each combination of multilevel scale values of adjacent pixels. Then, the light emission control unit 121 switches the gamma conversion table referenced in accordance with the combination of the multilevel scale values of adjacent pixels.

Incidentally, the embodiment in which the pattern of the switch on/off statuses of each sub address is varied is valuable also in a case that the skew correction is not made as in the first embodiment. For example, the moiré fringes or moiré stripes may appear in addition to the gradation of FIG. 9A, since the colored/solid colored pattern of each pixel is fixed, in the case that the image as shown in FIG. 9B is formed. On the other hand, it is possible to prevent the moiré fringes or moiré stripes by changing the pattern of switch on/off statuses of each pixel and thereby avoiding the occurrence of the fixed pattern.

Figure 19:
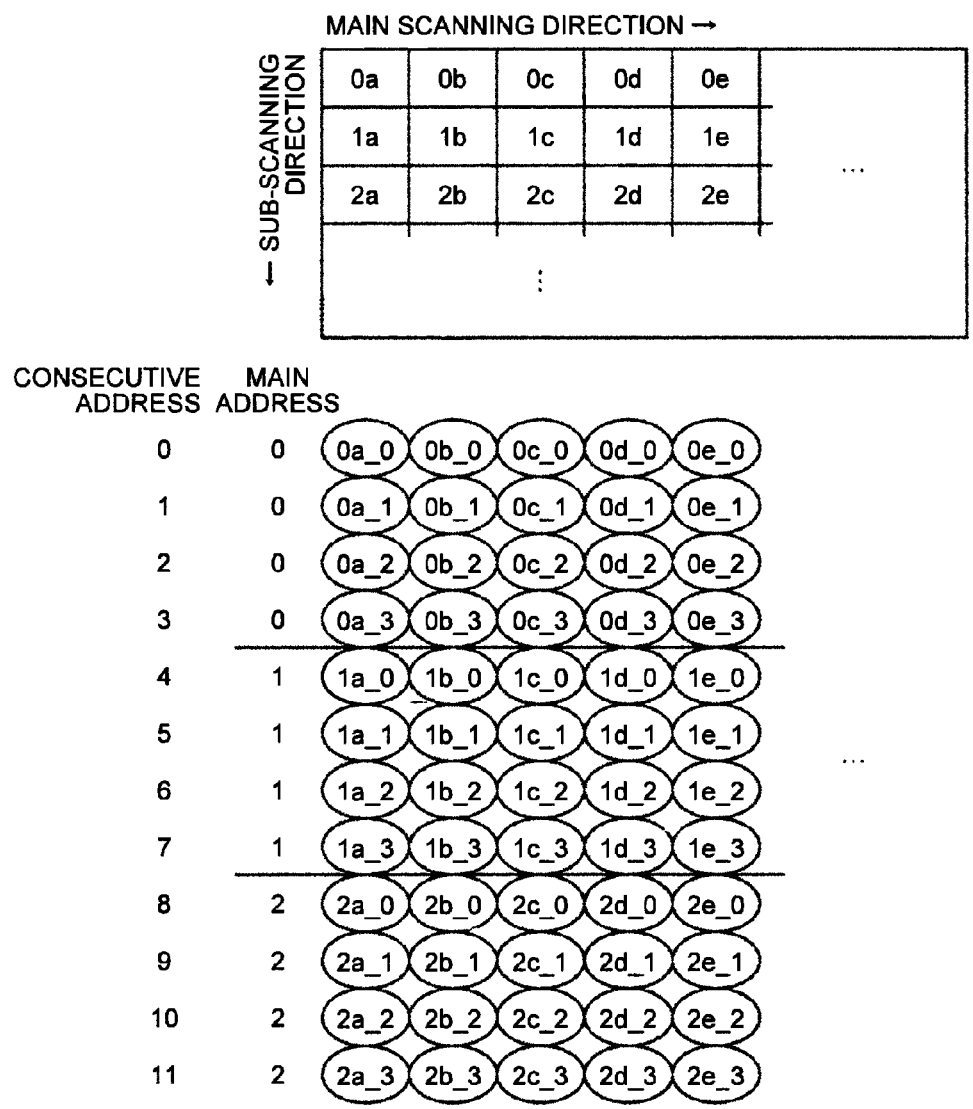
FIG. 19 is a diagram showing pixel information stored in a line memory and pixels to be output according to the second embodiment of the present invention.

In the first and second embodiments, the explanation is made on the case that the pixel data (pixel information) is read out from the previously main scanning line, if the value obtained by subtracting the skew correction amount from the sub line count value is negative, when the pixel data (pixel information) is read out at the Step S802 in FIG. 8, under the basic condition that the pixel data (pixel information) is read out in the order that it is stored into the line memory 122. Alternatively, the main address may be determined by setting the continuous address that is counted for each sub line, in addition to the main address for each main scanning line, so that the main address is determined on the basis of an integer portion of the quotient obtained by dividing the continuous address by the multiple number (4 in this embodiment) of the sub scanning direction resolution. FIG. 19 shows such an example.

FIG. 19 shows the relationship between the main address that indicates the original main scanning line and the continuous address that is counted for each sub line, in the embodiment that each main scanning line to be depicted is divided into sub lines. As shown in FIG. 19, the continuous address increases by one when the sub line increases by one. It is understood from the FIG. 19, the integer portion of the quotient obtained by dividing the continuous address by 4 (that is the multiple number of the sub scanning direction resolution) corresponds to the main address.

That is, the light emission control unit 121 counts the continuous address for each drawing of each sub address in the operation shown in FIG. 8, and reads out the pixel data (pixel information) from the main address corresponding to the integer portion of the quotient obtained by dividing the continuous address by the multiple number of the sub scanning direction resolution. As in the second embodiment, when the skew correction amount is taken into consideration, the similar process is performed under the condition that a value obtained by subtracting the skew correction amount from the continuous address count value is divided by the multiple number of the sub scanning direction resolution. It is possible to obtain the same effect also from this embodiment.

Incidentally, in this case, the multiple number N of the sub scanning direction resolution is preferably n-th power of 2 (n is a positive integer). Thereby, the process that takes the integer portion of the quotient obtained by dividing the continuous address by N equals to the process that truncates the lower N/2 bits of the original number when expressed in binary. Thus, the process can be simplified.

According to the present invention, it is possible to achieve the gradation expression with a simple configuration in the optical writing device using the binary head.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical writing device that forms an electrostatic latent image on a photosensitive element with a binary light source capable of controlling two statuses which are a switch on status and a switch off status, the device comprising:
   a pixel information acquiring unit that acquires multilevel pixel information in which one pixel is expressed in multilevel scales, the multilevel pixel information being information of each pixel for forming an image as the electrostatic latent image;
   a line pixel information storing unit that stores the acquired multilevel pixel information for each main scanning line; and
   a light emission control unit that optically exposes the photosensitive element by controlling the binary light source on the basis of the stored multilevel pixel information;
   wherein the light emission control unit exposes the photosensitive element with the binary light source with a period corresponding to N-fold in a sub scanning direction resolution of the stored multilevel pixel information, wherein N is a positive integer, so that the N times exposures corresponds to an exposure for one pixel in the original resolution,
   wherein the switch on status and the switch off status of the binary light source are controlled in the N times exposures with the binary light source for each pixel, on the basis of lighting rate information, the lighting rate information being for converting the multilevel scales into a lighting rate in the N times exposures.

2. The optical writing device according to claim 1, wherein the lighting rate information is information that stores a control value to control the switch on status and the switch off status of the binary light source for each combination of the multilevel scales and a sequence of the N times exposures, and
   the light emission control unit acquires the control value to control the switch on status and the switch off status of the binary light source from the lighting rate information, on the basis of the sequence of the N times exposures and a scale of a pixel to be depicted in the stored multilevel pixel information.

3. The optical writing device according to claim 2, wherein the light emission control unit changes the sequence of the N times exposures and the pixel to be depicted, on the basis of pixel shift information that indicates an amount of shift of the pixel in the sub scanning direction in accordance with a position in a main scanning direction, when acquiring the control value to control the switch on status and the switch off status of the binary light source.

4. The optical writing device according to claim 1, wherein the light emission control unit acquires the control value to control the switch on status and the switch off status of the binary light source from the lighting rate information that differs depending on the combination of the scale values of pixels adjacent to each other in the multilevel pixel information.

5. The optical writing device according to claim 1, wherein the line pixel information storing unit stores the multilevel pixel information for each main scanning line in an acquired order,
   the light emission control unit counts the number of exposures with the period corresponding to N-fold in the sub scanning direction resolution of the stored multilevel pixel information, and reads out the multilevel pixel information stored in the line pixel information storing unit, in accordance with a numeral value of an integer portion of a quotient obtained by dividing the counted value by N.

6. The optical writing device according to claim 5, wherein N is a numerical value corresponding to a positive integer power of two.

7. An image forming apparatus comprising the optical writing device according to claim 1.

8. A method for controlling an optical writing device that forms an electrostatic latent image on a photosensitive element with a binary light source capable of controlling two statuses which are a switch on status and a switch off status, the method comprising:

acquiring multilevel pixel information in which one pixel is expressed in multilevel scales, the multilevel pixel information being information of each pixel for forming an image as the electrostatic latent image, and storing the acquired multilevel pixel information in a storage medium for each main scanning line; and exposing the photosensitive element with the binary light source with a period corresponding to N-fold in a sub scanning direction resolution of the stored multilevel pixel information, wherein N is a positive integer, so that the N times exposures corresponds to an exposure for one pixel in the original resolution; and acquiring a control value to control the switch on status and the switch off status of the binary light source, in controlling the binary light source in the N times exposures for each pixel, on the basis of lighting rate information, the lighting rate information being for converting the multilevel scales into a lighting rate in the N times exposures.

9. A computer program product comprising a non-transitory computer-readable medium having computer-readable program codes embodied in the medium for controlling an optical writing device that forms an electrostatic latent image on a photosensitive element with a binary light source capable of controlling two statuses which are a switch on status and a switch off status, the program codes when executed causing a computer to execute:

acquiring multilevel pixel information in which one pixel is expressed in multilevel scales, the multilevel pixel information being information of each pixel for forming an image to be formed as the electrostatic latent image, and storing the acquired multilevel pixel information in a storage medium for each main scanning line; and exposing the photosensitive element with the binary light source with a period corresponding to N-fold in a sub scanning direction resolution of the stored multilevel pixel information, wherein N is a positive integer, so that the N times exposures corresponds to an exposure for one pixel in the original resolution; and acquiring a control value to control the switch on status and the switch off status of the binary light source, in controlling the binary light source in the N times exposures for each pixel, on the basis of lighting rate information, the lighting rate information being for converting the multilevel scales into a lighting rate in the N times exposures.

* * * * *